US 12,067,738 B2

(12) United States Patent
Gorban et al.

(10) Patent No.: US 12,067,738 B2
(45) Date of Patent: Aug. 20, 2024

(54) ESTIMATING GROUND TRUTH OBJECT KEYPOINT LABELS FOR SENSOR READINGS

(71) Applicant: Waymo LLC, Mountain View, CA (US)

(72) Inventors: Alexander Gorban, Scotts Valley, CA (US); Yin Zhou, Jr., San Jose, CA (US); Dragomir Anguelov, San Francisco, CA (US); Alessandro Giulianelli, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 398 days.

(21) Appl. No.: 17/472,418

(22) Filed: Sep. 10, 2021

(65) Prior Publication Data

US 2022/0084228 A1    Mar. 17, 2022

Related U.S. Application Data (60) Provisional application No. 63/077,468, filed on Sep. 11, 2020.

(51) Int. Cl.

| | | |
|---|---|---|
| *G06T 7/521* | (2017.01) | |
| *G01S 7/48* | (2006.01) | |
| *G01S 17/89* | (2020.01) | |
| *G01S 17/931* | (2020.01) | |
| *G05D 1/00* | (2006.01) | |
| *G06T 7/73* | (2017.01) | |

(52) U.S. Cl.
CPC ............ *G06T 7/521* (2017.01); *G01S 7/4808* (2013.01); *G01S 17/89* (2013.01); *G01S 17/931* (2020.01);
(Continued)

(58) Field of Classification Search
CPC ........ G01S 17/10; G01S 17/89; G01S 17/931; G01S 7/4808; G05D 1/0088;
(Continued)

(56) References Cited

U.S. PATENT DOCUMENTS

| | | |
|---|---|---|
| 10,943,681 B2 | 3/2021 | Yao et al. |
| 2018/0129865 A1 | 5/2018 | Zia et al. |

(Continued)

FOREIGN PATENT DOCUMENTS

| | | |
|---|---|---|
| DE | 102019101938 | 8/2019 |
| WO | WO2021155308 | 8/2021 |

OTHER PUBLICATIONS

International Search Report and Written Opinion in International Appln. No. PCT/US2021/049892, dated Dec. 24, 2020, 11 pages.
(Continued)

*Primary Examiner* — Peter B Kim
(74) *Attorney, Agent, or Firm* — Fish & Richardson P.C.

(57) ABSTRACT

Methods, systems, and apparatus, including computer programs encoded on a computer storage medium, for determining estimated ground truth object keypoint labels for sensor readings of objects. In one aspect, a method comprises obtaining a plurality of sets of label data for a sensor reading of an object; obtaining respective quality control data corresponding to each of the plurality of sets of label data, the respective quality control data comprising: data indicating whether the labeled location of the first object keypoint in the corresponding set of label data is accurate; and determining an estimated ground truth location for the first object keypoint in the sensor data keypoint from (i) the labeled locations that were indicated as accurate by the corresponding quality control data and (ii) not from the labeled locations that were indicated as not accurate by the corresponding quality control data.

20 Claims, 5 Drawing Sheets

(52) U.S. Cl.
CPC ............. *G05D 1/0088* (2013.01); *G06T 7/73* (2017.01); *G06T 2207/10028* (2013.01); *G06T 2207/20081* (2013.01); *G06T 2207/20084* (2013.01)

(58) Field of Classification Search
CPC . G06T 2207/10028; G06T 2207/20081; G06T 2207/20084; G06T 2207/30252; G06T 7/521; G06T 7/73
See application file for complete search history.

(56) References Cited

U.S. PATENT DOCUMENTS

| | | |
|---|---|---|
| 2019/0258878 A1 | 8/2019 | Koivisto et al. |
| 2019/0278983 A1 | 9/2019 | Iqbal et al. |
| 2020/0117912 A1 | 4/2020 | Thompson et al. |
| 2020/0372623 A1* | 11/2020 | Lawlor .............. G01C 21/3804 |

OTHER PUBLICATIONS

Iskakov et al., "Learnable Triangulation of Human Pose," CoRR, May 2019, arXiv:1905.05754v1, 9 pages.

Xiao et al., "Simple Baselines for Human Pose Estimation and Tracking," CoRR, Aug. 2018, arXiv:1804.06208, 16 pages.

Xu et al., "GHUM & GHUML: Generative 3D Human Shape and Articulated Pose Models," Proceedings of the IEEE/CVF Conference on Computer Vision and Pattern Recognition, 2020, pp. 6184-6193.

International Preliminary Report on Patentability in International Appln. No. PCT/US2021/049892, dated Mar. 23, 2023, 8 pages.

* cited by examiner

ESTIMATING GROUND TRUTH OBJECT KEYPOINT LABELS FOR SENSOR READINGS

CROSS-REFERENCE TO RELATED APPLICATION

This application claims priority to U.S. Provisional Application No. 63/077,468, filed on Sep. 11, 2020. The disclosure of the prior application is considered part of and is incorporated by reference in the disclosure of this application.

BACKGROUND

This specification relates to determining locations of object keypoints in sensor readings. For example, the sensor readings include readings of on-board sensors of autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on one or more computers in one or more locations that determines estimated ground truth object keypoint labels for sensor readings of objects. In other words, given a sensor reading of an object, the system determines an estimate of the ground truth location of the object keypoints of the object in the sensor reading. Optionally, the system can also determine estimated ground truth values for one or more categorical variables of a given object keypoint, e.g., whether the object keypoint is occluded in the sensor reading or not.

For example, the sensor readings can be point clouds, i.e., three-dimensional or higher point clouds, generated by one or more laser sensors, e.g., sensors of an autonomous vehicle, robot, or other autonomous agent.

For example, the objects can be humans, e.g., pedestrians or cyclists or other humans navigating through an environment surrounding an autonomous vehicle. In this example, the object keypoints can be various body joints or other locations on the body of a human, e.g., ankle, elbow, head, knee, shoulder, hip and so on.

As another example, the objects can be target objects, e.g., assembly components in an assembly line, to be manipulated by a robot. In this example, the object keypoints can be various points on graspable surfaces of the objects.

According to an aspect, there is provided a method performed by one or more computers, the method comprising: obtaining a plurality of sets of label data for a sensor reading of an object, each set of label data comprising: data identifying a labeled location of a first object keypoint in the sensor reading; obtaining respective quality control data corresponding to each of the plurality of sets of label data, the respective quality control data comprising: data indicating whether the labeled location of the first object keypoint in the corresponding set of label data is accurate; and determining an estimated ground truth location for the first object keypoint in the sensor reading from (i) the labeled locations that were indicated as accurate by the corresponding quality control data and (ii) not from the labeled locations that were indicated as not accurate by the corresponding quality control data.

The method may further comprise generating a training example that associates the estimated ground truth location of the first object keypoint with the sensor reading; and adding the training example to training data for training a machine learning model.

The method may further comprise training the machine learning model on the training data that includes the training example.

The sensor reading may be a three-dimensional point cloud generated by one or more laser sensors.

Determining an estimated ground truth location for the first object keypoint in the sensor reading may comprise computing an average of the labeled locations that were indicated as accurate by the corresponding quality control data.

The method may further comprise determining whether each labeled location is within a threshold distance of the estimated ground truth distance.

The threshold distance may be specific to a type of the first object keypoint.

The method may further comprise: for each labeled location that is within the threshold distance of the estimated ground truth data, generating data indicating that the labeled location is accurate; and for each labeled location that is not within the threshold distance of the estimated ground truth data, generating data indicating that the labeled location is not accurate.

The method may further comprise: for each labeled location that is within the threshold distance of the estimated ground truth data, determining whether the quality control data indicates that the labeled location is accurate and, in response to determining that the quality control data indicates that the labeled location is not accurate, generating data indicating that the quality control data is not accurate; and for each labeled location that is not within the threshold distance of the estimated ground truth data, determining whether the quality control data indicates that the labeled location is accurate and, in response to determining that the quality control data indicates that the labeled location is accurate, generating data indicating that the quality control data is not accurate.

Each of the plurality of sets of label data may further comprise labeled values for one or more categorical properties of the first object keypoint; the respective quality control data corresponding to each of the plurality of sets of label data, the respective quality control data may comprise, for each of the one or more categorical properties, data indicating whether the labeled value for the categorical property in the corresponding set of label data is accurate; and the method may further comprise, for each of the one or more categorical properties, determining an estimated ground truth value for the categorical property based on (i) the labeled values that were indicated as accurate by the corresponding quality control data and (ii) not from the labeled values that were indicated as not accurate by the corresponding quality control data.

The one or more categorical properties may comprise one or more of: a presence of the first object keypoint or a visibility of the first object keypoint.

Determining an estimated ground truth value for the categorical property may comprise determining the estimated ground truth value for the categorical property to be the value that occurs most frequently among labeled values that were indicated as accurate by the corresponding quality control data.

The method may further comprise: for each of the one or more categorical properties, determining that the labeled values that match the estimated ground truth value for the categorical property are accurate.

The method may further comprise: selecting, as an accurate set of label data, any set of label data that has a labeled location that was determined to be accurate and labeled values for each of the categorical properties that were determined to be accurate.

Obtaining respective quality control data corresponding to each of the plurality of sets of label data may comprise, for each of the plurality of sets of label data: providing, for presentation to a respective user on a respective user device, the sensor reading and data identifying the labeled location of the first object keypoint in the set of label data; and obtaining, from the user device, the data indicating whether the labeled location is accurate.

The method may further comprise obtaining a set of second label data for a second sensor reading of a second object, the set of second label data comprising: data identifying a labeled location of a second object keypoint in the second sensor reading; generating a noisy location for the second object keypoint that adds noise to the labeled location; generating a noisy set of label data for the second sensor reading of the second object, the noisy set of label data comprising: data identifying the noisy location for the second object keypoint; obtaining second quality control data corresponding to the noisy set of label data, the quality control data comprising: data indicating whether the noisy location is accurate; and determining that the second quality control data is not accurate when the second quality control data indicates that the noisy location is accurate.

According to another aspect, there is provided a system comprising one or more computers and one or more storage devices storing instructions that are operable, when executed by the one or more computers, to cause the one or more computers to perform the operations of the above method aspect.

According to a further aspect, there is provided a computer storage medium encoded with instructions that, when executed by one or more computers, cause the one or more computers to perform the operations of the method aspect.

It will be appreciated that features described in the context of one aspect may be combined with features described in the context of another aspect.

Particular embodiments of the subject matter described in this specification can be implemented so as to realize one or more of the following advantages.

An autonomous or semi-autonomous vehicle system can use a machine learning model to process data derived from sensor readings including 3-D point cloud data to perform 3-D pose estimation of objects of interest, e.g., pedestrians, cyclists, or other vehicles. Better-informed planning decisions can then be generated based on the pose estimations in order to cause the vehicle to travel along a safe and comfortable trajectory. In addition, accurately performing keypoint detection can improve the performance of many other systems, e.g., control systems for other mobile agents such as robots.

Labeled training data that includes LIDAR point clouds and corresponding human-assigned labels (e.g., keypoints) has been utilized in training such machine learning models. However, the human-assigned labels can include errors, e.g., misplaced or misclassified keypoints within a point cloud. When labelling of thousands or millions of point clouds are considered, the total number of errors that are present in the labeled training data can be significant. Moreover, generating such labeled point cloud training data can be expensive, for example in terms of the labor cost relating to the time-consuming labeling process performed by human labelers, let alone any additional labor cost associated with the quality control process performed by human reviewers that is used to ensure the overall accuracy of the labeled training data.

This specification, however, describes techniques that overcome the aforementioned drawbacks that are commonly seen in the labeled training data which hinder successful machine learning training. At a high level, the disclosed techniques allow for a system to automatically generate an arbitrarily large amount of training data that includes high quality labels (e.g., keypoints with accurate locations) assigned to data derived from sensor readings (e.g., point cloud data) and that can be used to improve the performance for a control system of an agent, e.g., an autonomous vehicle or a robot, that implements or otherwise makes use of a machine learning model once it has been trained on the training data.

In more detail, the techniques described in this specification allow for automatically quality controlling the labeling process of data derived from sensor readings, e.g., for quality controlling a set of different 3-D locations for a same object keypoint that have been assigned by a group of different human labelers with respect to a same three-dimensional point cloud. Using techniques described in this specification can increase the objectivity of the quality control process, allow for computation of quantifiable labeling quality scores as well as consensus scores across a pool of quality verification providers. Certain techniques described in this specification allow the system to scalably label highly ambiguous 3-D point cloud data with consistent quality which is crucial for implementing and training new machine learning models to perform fine-grained perception of various objects, including humans.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that determines estimated ground truth object keypoint labels for sensor readings of objects.

Figure 1:
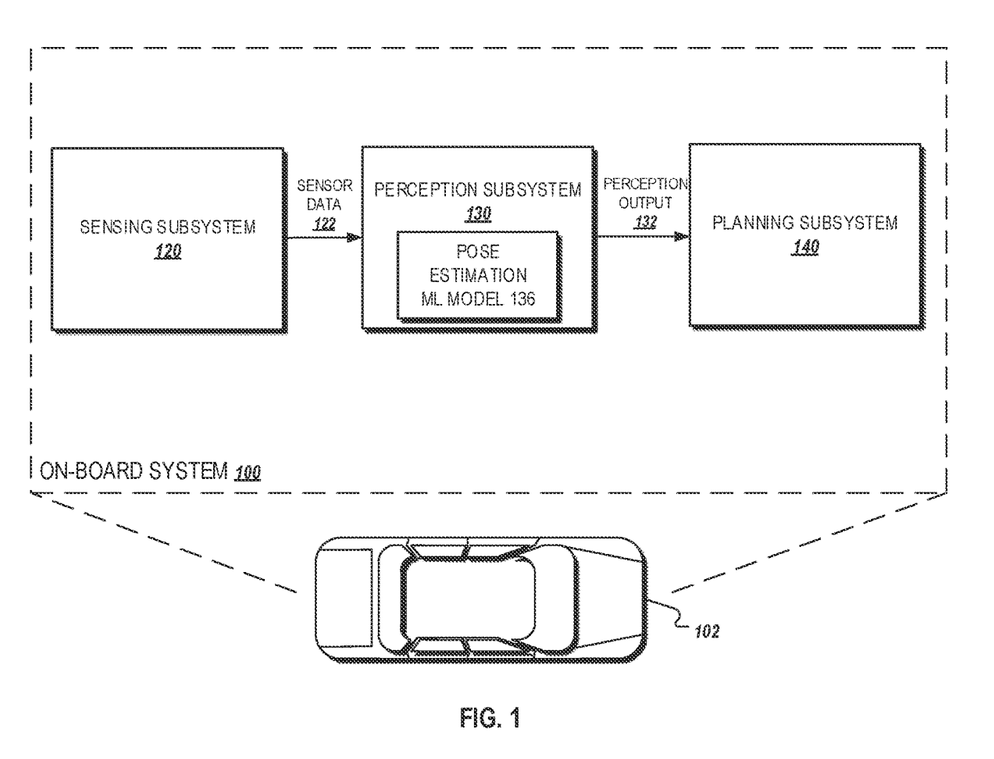
FIG. 1 is a block diagram of an example on-board system.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a prediction indicates that a human driver is about to collide with a detected object, e.g., a pedestrian, a cyclist, another vehicle. While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a sensor subsystem 120 which enables the on-board system 100 to "see" the environment in a vicinity of the vehicle 102. The sensor subsystem 120 includes one or more sensors, some of which are configured to receive reflections of electromagnetic radiation from the environment in the vicinity of the vehicle 102. For example, the sensor subsystem 120 can include one or more laser sensors (e.g., LIDAR sensors) that are configured to detect reflections of laser light. As another example, the sensor subsystem 120 can include one or more radar sensors that are configured to detect reflections of radio waves. As another example, the sensor subsystem 120 can include one or more camera sensors that are configured to detect reflections of visible light.

The sensor subsystem 120 repeatedly (i.e., at each of multiple time points) uses raw sensor measurements, data derived from raw sensor measurements, or both to generate sensor data 122 that characterizes the latest state of an environment (i.e., an environment at the current time point) in the vicinity of the vehicle 102. The raw sensor measurements indicate the directions, intensities, and distances travelled by reflected radiation. For example, a laser sensor or other sensor in the sensor subsystem 120 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In particular, the sensor data 122 includes point cloud data generated by using one or more laser sensors in the sensor subsystem 120. A point cloud is a collection of data points defined by a given coordinate system. For example, in a three-dimensional coordinate system, a point cloud can define the shape of some real or synthetic physical system, where each point in the point cloud is defined by three values representing respective coordinates in the coordinate system, e.g., (x, y, z) coordinates. As another example, in a three-dimensional coordinate system, each point in the point cloud can be defined by more than three values, wherein three values represent coordinates in the coordinate system and the additional values each represent a property of the point of the point cloud, e.g., an intensity, second return, or elongation of the sensor measurement that is represented by the point.

The on-board system 100 can provide the sensor data 122 generated by the sensor subsystem 120 to a perception subsystem 130 for use in generating perception outputs 132.

The perception subsystem 130 implements components that identify objects within a vicinity of the vehicle. The components typically include one or more fully-learned machine learning models. A machine learning model is said to be "fully-learned" if the model has been trained to compute a desired prediction when performing a perception task. In other words, a fully-learned model generates a perception output based solely on being trained on training data rather than on human-programmed decisions.

In particular, the components include a pose estimation machine learning model 136, and the perception output 132 can include object pose estimation data that defines a plurality of keypoint locations in the sensor data 122. Generally, the pose of an object is a combination of the position and orientation of the object in the input point cloud. Any of a variety of machine learning models that generate outputs that are locations in received input point clouds can be used as the pose estimation machine learning model 136. As a particular example, the pose estimation machine learning model 136 can be the model described in Xiao, B., et al. "Simple Baselines for Human Pose Estimation and Tracking." arXiv preprint arXiv:1804.06208, Iskakov, K., et al. "Learnable Triangulation of Human Pose." arXiv preprint arXiv:1905.05754v1, or Xu, H., et al. "GHUM & GHUML: Generative 3D Human Shape and Articulated Pose Models." 2020 IEEE/CVF Conference on Computer Vision and Pattern Recognition (CVPR), 2020, pp. 6183-6192, the entire contents of which are hereby incorporated herein in their entirety.

The keypoint locations generated by the pose estimation machine learning model 136 can point to, i.e., correspond to the locations of, points of interest in the environment that is characterized in the sensor data 122. For example, the pose estimation machine learning model 136 can generate as the model output a pose vector that includes an estimated 3-D location in the 3-D point cloud of each of a predetermined number of points of interest on objects in the environment, e.g., body joints or other (surface or internal) locations of each object. For example, the objects can be humans, e.g., pedestrians or cyclists or other humans navigating through an environment surrounding the vehicle 102. In this example, the object keypoints can be various body joints or other locations on the body of a human, e.g., ankle, elbow, head, knee, shoulder, hip and so on.

The on-board system 100 can provide the perception outputs 132 to a planning subsystem 140. When the planning subsystem 140 receives the perception outputs 132, the planning subsystem 140 can use the perception outputs 132 to generate planning decisions which plan the future trajectory of the vehicle 102. The planning decisions generated by the planning subsystem 140 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. The planning decisions generated by the planning subsystem 140 can be provided to a control system of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

In order for the planning subsystem 140 to generate planning decisions which cause the vehicle 102 to travel along a safe and comfortable trajectory, the on-board system 100 must provide the planning subsystem 140 with high quality perception outputs 132 including high quality pose estimation outputs. In general, high quality pose estimation outputs can facilitate understanding of current behavior as well as prediction of future behavior of various dynamic objects (e.g., humans, e.g., pedestrians or cyclists) in the environment surrounding the vehicle 102, thereby allowing for the vehicle to respond to their movements in a more timely and properly manner.

In various scenarios, however, training a machine learning model to accurately determine keypoint locations within sensor data can be challenging. This is oftentimes due to insufficient amount or inferior quality of (labeled) training data, i.e., the data that is used in training the machine learning model to determine keypoint locations within sensor data. Specifically, human-assigned labels can and usually will include errors, e.g., misplaced or misclassified keypoints within a point cloud. When labelling of thousands or millions of point clouds are considered, the total number of errors that are present in the labeled training data can be significant. These label errors largely inhibit successful learning of the machine learning model when it is being trained on the training data.

Thus, to generate pose estimation outputs with greater overall accuracy, the pose estimation machine learning model implemented by the perception subsystem 130 has been trained on a labeled training dataset that has undergone a quality control process. When generating the labeled training dataset, the quality control process can be used to increase the quality of the training examples used in training the machine learning model, thereby resulting in the trained machine learning model performing object pose estimation tasks more effectively. Generating a labeled training dataset and training a pose estimation machine learning model on the labeled training dataset will be described in more detail below.

Figure 2:
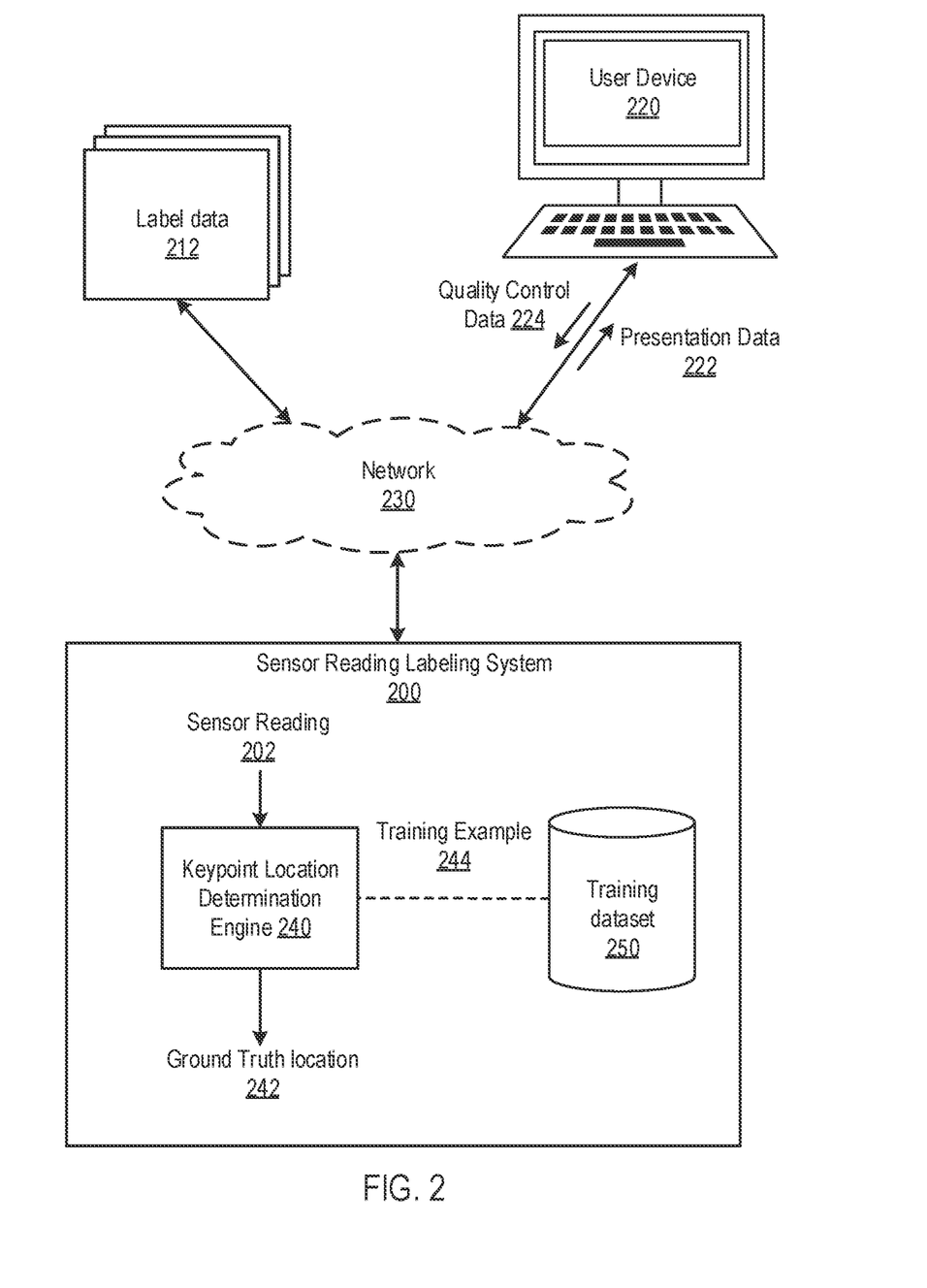
FIG. 2 is a block diagram of an example sensor reading labeling system.

FIG. 2 is a block diagram of an example sensor reading labeling system 200. The sensor reading labeling system 200 is an example of systems implemented as computer programs on one or more computers in one or more locations in which the systems, components, and techniques described below are implemented.

At a high level, the sensor reading labeling system 200 is a system that, given a sensor reading 202 of an object, determines an estimate of the ground truth location 242 of each of one or more object keypoints of the object in the sensor reading.

In particular, the system 200 obtains i) a plurality of sets of label data 212 for the sensor reading of the object and ii) respective quality control data 224 corresponding to each of the plurality of sets of label data, and uses the obtained data to determine an estimated ground truth location 242 for each of one or more object keypoints in the sensor reading. Optionally, the system 200 can also determine estimated ground truth values for one or more categorical variables of a given object keypoint, e.g., whether the object keypoint is occluded in the sensor reading or not.

In some cases, for the given sensor reading 202, each set of label data 212 can include data identifying a labeled location of each of one or more object keypoints in the sensor reading. In these cases, the respective quality control data 224 can include data indicating whether the labeled location of each of the one or more object keypoints in the corresponding set of label data 212 is accurate or not.

For example, the sensor readings can be point clouds, i.e., three-dimensional or higher point clouds, generated by one or more laser sensors, e.g., sensors of an autonomous vehicle, robot, or other autonomous agent.

For example, the objects can be humans, e.g., pedestrians or cyclists or other humans navigating through an environment. In this example, the object keypoints can be various body joints or other locations on the body of a human, e.g., ankle, elbow, head, knee, shoulder, hip and so on.

The sensor reading labeling system 200 can obtain the data in any of a variety of ways. For example, the system 200 can receive the label data 212 and the quality control data 224 as an upload from a remote user of the system over a data communication network 230 (e.g., an intranet or the Internet), e.g., using an application programming interface (API) made available by the system 200. As another example, the system 200 can receive an input from a user specifying which data that is already maintained by the system 200 should be used as data identifying the label data 212 and as the quality control data 224.

In some cases, the label data 212 may include manually generated label data, automatically generated label data, or both. Specifically, manual data labeling process may involve asking humans to make judgments about object keypoint locations in a given (unlabeled) sensor reading, i.e., to identify or otherwise specify the location of each of one or more keypoints of an object depicted in the sensor reading. To make this labeling process more efficient and less expensive, the label data 212 may also be automatically generated, e.g., by making use of another, already trained pose estimation machine learning model to automatically process (unlabeled) sensor readings to generate corresponding label data.

In some cases, to obtain the quality control data 224 corresponding to each of the plurality of sets of label data 212, the system 200 can provide, e.g., over a data communication network 230, presentation data 222 for presentation in a user interface on a respective user device 220 (e.g., a user computer). The presentation data 222 can include the sensor reading and data identifying the labeled location of each of the one or more object keypoints in the set of label data. A respective user of the user device 220 may then submit, e.g., through the user interface, user inputs indicating whether the labeled location is accurate.

In some implementations, the sensor reading labeling system 200 or another system can generate a training example 244 that associates the estimated ground truth location 242 of each of the one or more object keypoints with the sensor reading 202. The training example 244 can then be added to a training dataset 250 that may be later used for training a machine learning model. In the case where the training does not take place locally, the sensor reading labeling system 200 can provide the training dataset 250 by a wired or wireless connection to a remote training system.

Figure 3:
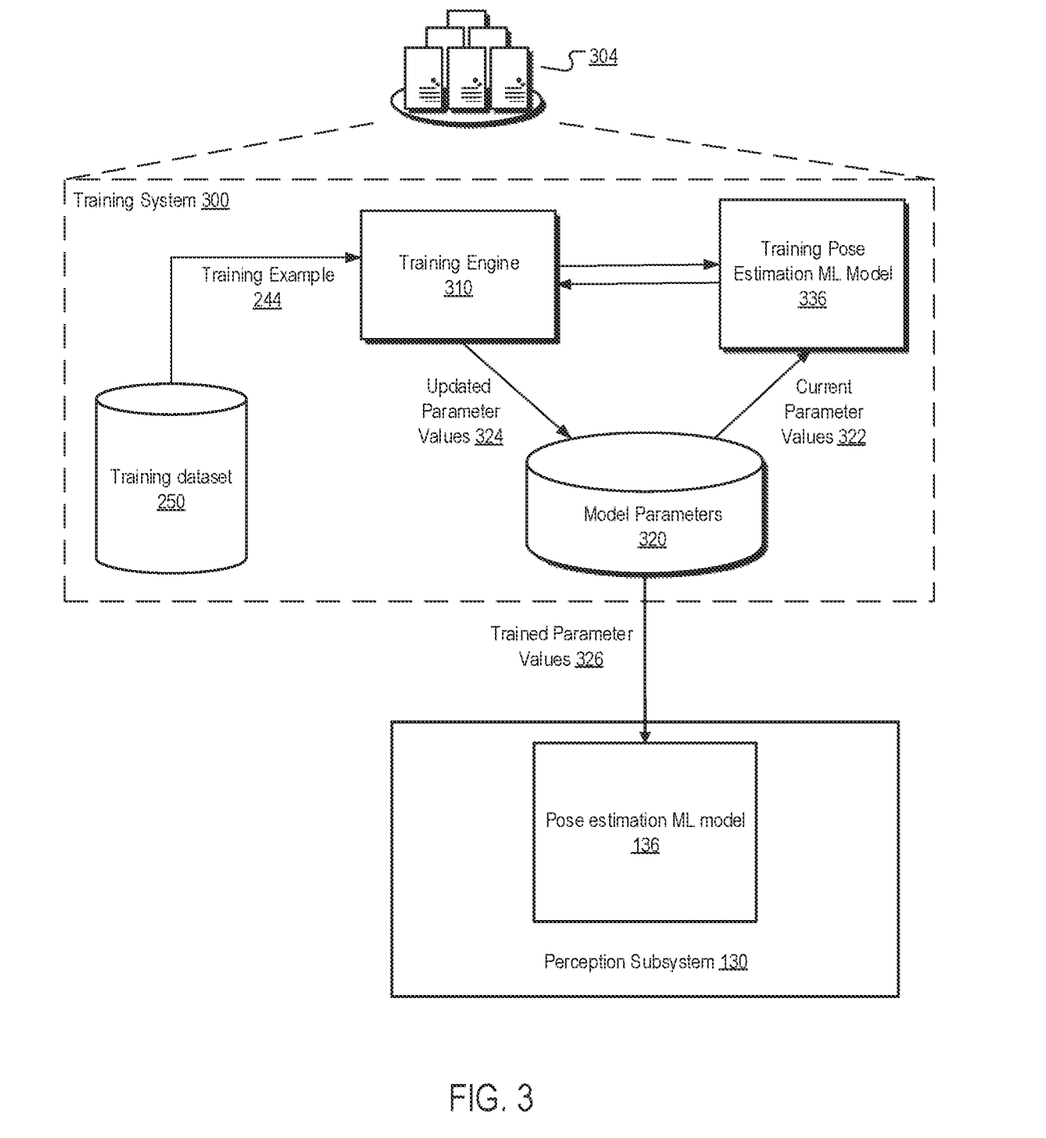
FIG. 3 illustrates an example training system.

FIG. 3 is a block diagram of an example training system 300. The training system 300 is an example of systems implemented as computer programs on one or more computers in one or more locations in which the systems, components, and techniques described below are implemented.

To allow the perception subsystem 130 to accurately generate perception outputs 132 including object pose estimation outputs, the training system 300 can determine trained parameter values 326 of the pose estimation machine learning model 136 included in the perception subsystem 130. While the perception subsystem 130 may be implemented on-board a vehicle as described above, the sensor reading labeling system 200, the training system 300, or both may be hosted within a data center 304, which can be a distributed computing system having hundreds or thousands of computers in one or more locations.

The training system 300 includes a training pose estimation machine learning model 336 that is configured to process an input that includes a point cloud characterizing an object to generate an output that defines an estimated location in the point cloud of each of a predetermined number of body joints or other (surface or internal) locations of the object. For example, if the point cloud is 3-D point cloud (i.e., with each point in the point cloud defined by three values representing its coordinates in a 3-D coordinate system and, optionally, one or more additional values that each represent a property of the point of the point cloud, e.g., an intensity of the point in the point cloud), then each estimated location defined by the output can similarly be a 3-D location with respect to the 3-D coordinate system.

The training system 300 includes one or more computing devices having software or hardware modules that implement the operations of the training pose estimation machine learning model 336. For example, if the training pose estimation machine learning model 336 is a pose estimation neural network, then the training system 300 includes one or more computing devices having software or hardware modules that implement the respective operations of each layer of the training pose estimation neural network according to an architecture of the training pose estimation neural network.

The training pose estimation machine learning model 336 is generally the same model as the on-board pose estimation model 136. For example, if the training pose estimation model is a neural network, then it generally has the same architecture as the on-board pose estimation neural network included in the perception subsystem 130.

The training system 300 can compute the operations of the training pose estimation machine learning model 336 using current values of parameters 322 stored in a collection of model parameters 320. Although illustrated as being logically separated, the model parameters 320 and the software or hardware modules performing the operations may actually be located on the same computing device or on the same memory device.

The training system 300 trains the training pose estimation machine learning model 336 using a training data set 250 which includes multiple training examples 244. The training examples 244 may be generated by the sensor reading labeling system 200 using techniques described above with reference to FIG. 2. Each of the training examples 244 may include: (i) an input of the training pose estimation machine learning model including a point cloud, and (ii) label data including data identifying an (estimated) ground truth location of each of one or more object keypoints in the point cloud.

The training pose estimation machine learning model 336 can process the inputs from the training examples 244 to generate, for each training example 244, an output which specifies the predicted location of each of one or more object keypoints in the point cloud. A training engine 310 compares predicted locations to the ground truth locations specified by the label data in the training example 244. For example, when the training pose estimation machine learning model 336 is a neural network, the training engine 310 can compute gradients of a regression loss function (e.g., a MSE loss function) that measures a difference between the predicted locations and the ground truth locations specified by the label data in the training example 244. The training engine 310 can use the gradients to generate updated model parameters 324.

The training engine 310 generates updated model parameter values 324 by using an appropriate machine learning training technique (e.g., stochastic gradient descent). The training engine 324 can then update the collection of model parameters 320 using the updated model parameter values 324.

After training is complete, the training system 300 can provide a set of trained parameter values 326 to the on-board system 100 for use in generating object pose estimation outputs that enable generation of safe and timely planning decisions which plan the future trajectory of the vehicle 102. The training system 300 can provide the set of trained parameter values 326 by a wired or wireless connection to the on-board system 100.

In some implementations, a machine learning model trained by using the training system 300 of FIG. 3 can be additionally or alternatively deployed at a different subsystem of the on-board system 100, or at another system different from the on-board system 100, e.g., at a robot control system, and can be configured to perform a different pose estimation task, e.g., to generate keypoint locations that point to graspable surfaces of objects that are depicted in the point cloud.

Figure 4:
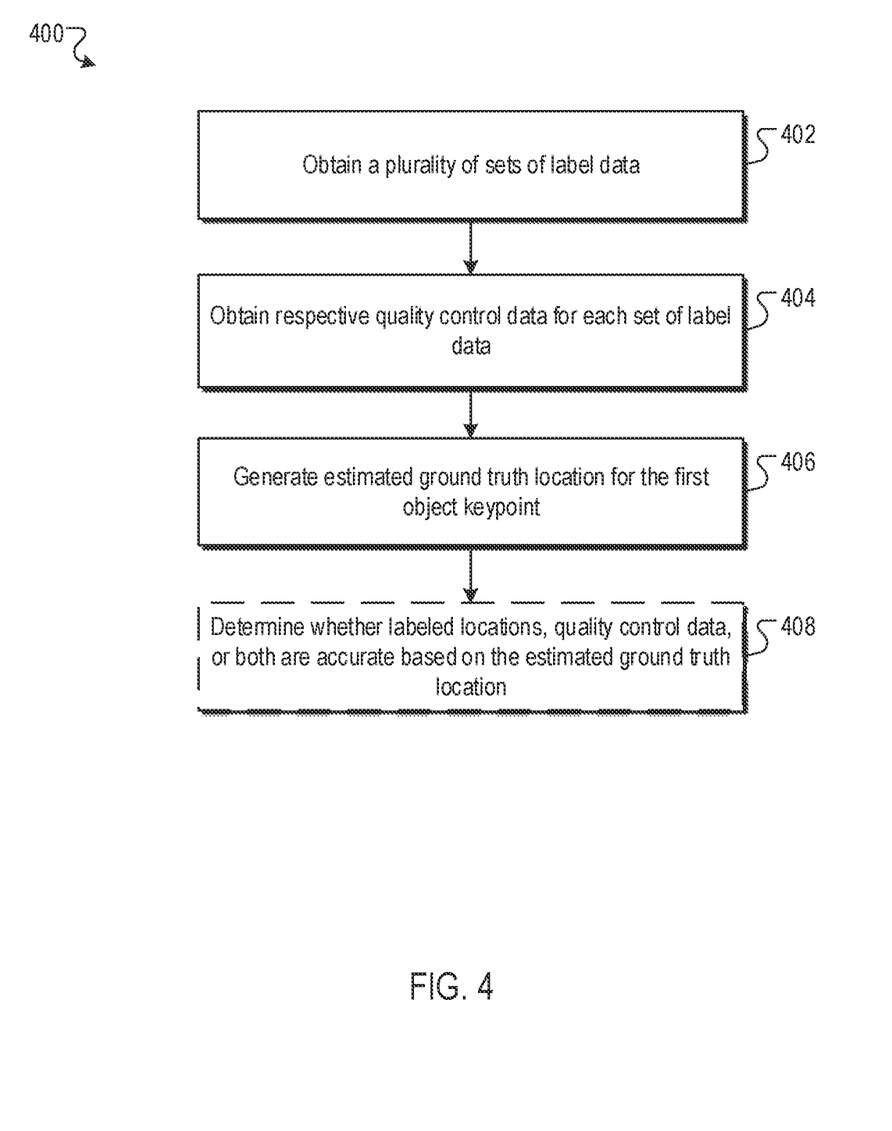
FIG. 4 is a flow diagram of an example process for generating an estimated ground truth location of an object keypoint.

FIG. 4 is a flow diagram of an example process 400 for generating an estimated ground truth location of an object keypoint. For convenience, the process 400 will be described as being performed by a system of one or more computers located in one or more locations. For example, a sensor reading labeling system, e.g., the sensor reading labeling system 200 of FIG. 2, appropriately programmed in accordance with this specification, can perform the process 400.

The system obtains a plurality of sets of label data for a sensor reading of an object (step 402). Each set of label data includes data identifying a labeled location of a first object keypoint in the sensor reading. For example, each set of label data may have been generated for the same sensor reading but by a different user.

Each set of label data can optionally include labeled values for each of one or more categorical properties of the first object keypoint. For example, the one or more categorical properties of the first object keypoint may include a presence of the first object keypoint or a visibility of the first object keypoint, and the labeled values for each categorical property may be a binary variable (0 for no or 1 for yes).

The system obtains respective quality control data corresponding to each of the plurality of sets of label data (step 404). For example, each set of label data can be assigned to a different user to perform quality control on the labels in the set of label data. The respective quality control data includes data indicating whether the labeled location of the first object keypoint in the corresponding set of label data is accurate.

The respective quality control data can optionally include, for each of the one or more categorical properties, data indicating whether the labeled value for the categorical property in the corresponding set of label data is accurate.

In particular, in this way, the system obtains multiple sets of label data for a same sensor reading of a same object, as well as corresponding quality control data for each of the multiple sets of the label data. The system can then proceed to use the label data and the quality control to determine an estimated ground truth location for the first object keypoint in the sensor reading.

The system determines an estimated ground truth location for the first object keypoint in the sensor reading from (i) the labeled locations that were indicated as accurate by the corresponding quality control data and (ii) not from the labeled locations that were indicated as not accurate by the corresponding quality control data (step 406). For example, the system can determine the estimated ground truth location to be the average of the labeled locations that were indicated as accurate by the corresponding quality control data. As another example, the system can determine the estimated ground truth location to be the labeled location that occurs most frequently among all of the labeled locations that were indicated as accurate by the corresponding quality control data.

The system can also determine, for each of the one or more categorical properties, an estimated ground truth value for the categorical property based on (i) the labeled values that were indicated as accurate by the corresponding quality control data and (ii) not from the labeled values that were indicated as not accurate by the corresponding quality control data. In particular the system can determine the estimated ground truth value for the categorical property to be the value that occurs most frequently among labeled values that were indicated as accurate by the corresponding quality control data.

In some implementations, the system can generate a training example based on associating the estimated ground truth location for the first object keypoint with the sensor reading of the object, and add the training example to the training dataset for the pose estimation machine learning model.

Optionally, in some implementations, the system can then determine whether the labeled locations, the quality control data, or both, are accurate based on the estimated ground truth location for the first object keypoint (step 408). That is, rather than using only the quality control data to determine whether a given labeled location is accurate, the system can instead compare the labeled location to the estimated ground truth location in order to determine whether the labeled location is accurate (and, accordingly, whether the quality control data corresponding to the labeled location is accurate).

To determine whether the labeled locations of the first object keypoint as specified in received label data are accurate, the system can determine whether each labeled location is within a threshold distance of the estimated ground truth location. The threshold distance can be specific to the type of the first object keypoint. As described above, in cases where the object is a human, the type of the first object keypoint can be ankle, elbow, head, knee, shoulder, or hip, to name just a few examples. For example, the threshold distance for a wrist or an ankle can be greater than that of the nose or the center of head.

For each labeled location that is within the threshold distance of the estimated ground truth location, the system can generate data indicating that the labeled location is accurate. Alternatively, for each labeled location that is not within the threshold distance of the estimated ground truth location, the system can generate data indicating that the labeled location is not accurate.

For each labeled location that is within the threshold distance of the estimated ground truth location, the system can determine whether the quality control data indicates that the labeled location is accurate and, in response to determining that the quality control data indicates that the labeled location is not accurate, the system can generate data indicating that the quality control data is not accurate.

For each labeled location that is not within the threshold distance of the estimated ground truth location, the system can determine whether the quality control data indicates that the labeled location is accurate and, in response to determining that the quality control data indicates that the labeled location is accurate, the system can generate data indicating that the quality control data is not accurate.

For each of the one or more categorical properties, the system can determine that the labeled values that match the estimated ground truth value for the categorical property are accurate.

In some implementations, the system additionally uses noise injection to determine the accuracy of the received quality control data. This is described further below with reference to FIG. 5.

In some implementations, in addition to or instead of generating training examples based on using the estimated ground truth location for the first object keypoint, the system can generate training examples based on associating with the sensor reading the labeled locations for the first object keypoint in the sets of received label data that have been determined to be accurate. In these implementations, the system can select, as an accurate set of label data, any set of label data that has a labeled location that was determined to be accurate and, optionally, labeled values for each of the categorical properties that were determined to be accurate. The accurate set of label data that has been selected can then be used by the system to generate the training example to be added to the training dataset for the pose estimation machine learning model. The accurate set of label data can also be used by the system (or another system) to evaluate the performance of the provider of the label data or quality control data, e.g., in terms of keypoint location accuracy.

While the description of FIG. 4 describes how to generate an estimated ground truth location for a single keypoint of a single object, there can be multiple keypoints of a single object and multiple objects (each with their own keypoints) in a given sensor reading, and these can all be labeled by the sets of label data. In such cases, the system can perform the process 400 for all of the object keypoints that have been labeled by the sets of label data in parallel to determine estimated ground truth locations for all of the object keypoints in the sensor reading.

Figure 5:
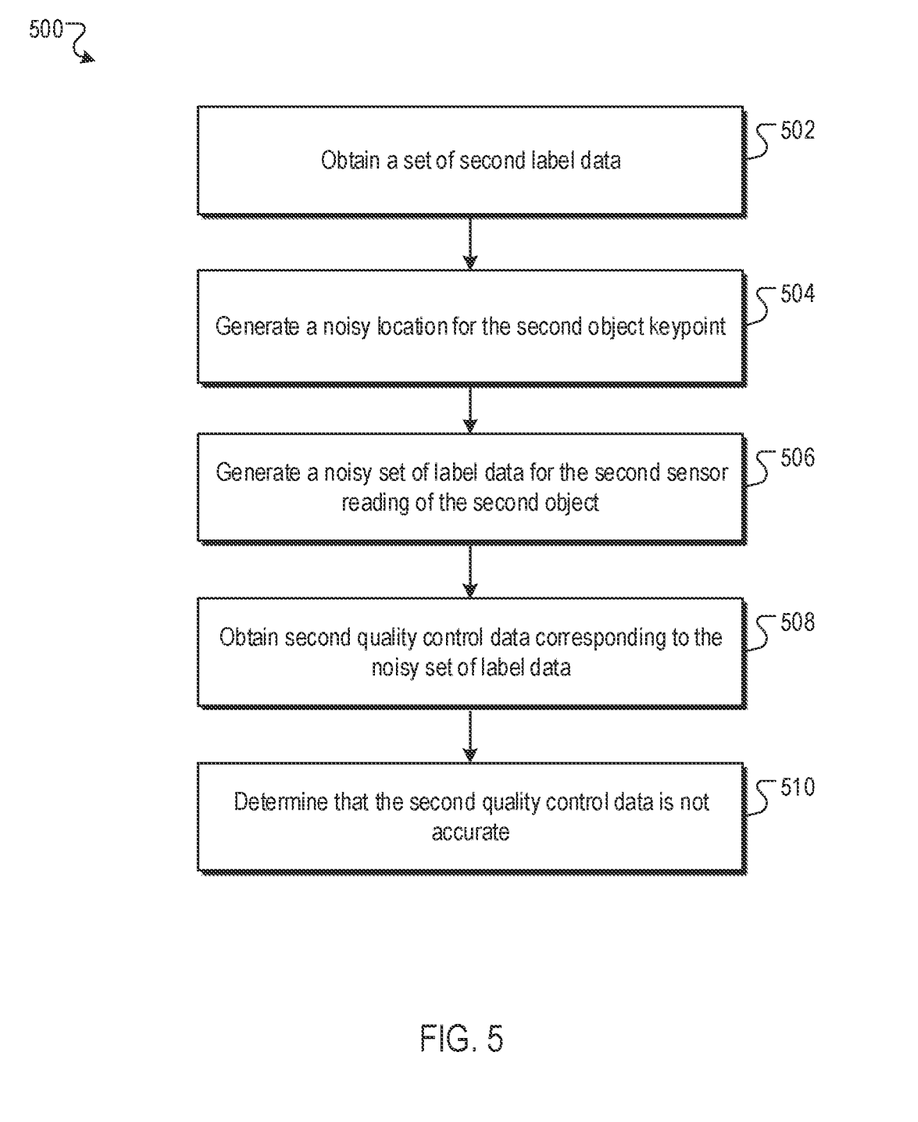
FIG. 5 is a flow diagram of an example process for determining whether quality control data is accurate.

FIG. 5 is a flow diagram of an example process 500 for determining whether quality control data is accurate. For convenience, the process 500 will be described as being performed by a system of one or more computers located in one or more locations. For example, a sensor reading labeling system, e.g., the sensor reading labeling system 200 of FIG. 2, appropriately programmed in accordance with this specification, can perform the process 500.

The system obtains a set of second label data for a second sensor reading of a second object (step 502). The set of second label data includes data identifying a labeled location of a second object keypoint (which may be the same or different from the first object keypoint in process 400) in the second sensor reading. For example, each set of second label data may have been generated for the same second sensor reading (which may be the same or different from the sensor reading in process 400) but by a different user.

The system generates a noisy location for the second object keypoint that adds noise to the labeled location (step 504). For example, the noisy location can be a new location in the second sensor reading that is a random distance away from the labeled location along a random direction. Additionally or alternatively, the system generates a noisy type for the second object keypoint based on randomly modifying the original type of the second object keypoint. For example, the second object keypoint which is of the original type of ankle, may be modified to have the noisy type of knee.

The system generates a noisy set of label data for the second sensor reading of the second object (step 506). The noisy set of label data includes data identifying the noisy location, noisy type, or both for the second object keypoint.

The system obtains second quality control data corresponding to the noisy set of label data (step 508). The quality control data includes data indicating whether the noisy location is accurate. To obtain the second quality control data, the system can provide, for presentation on a user interface, the second sensor reading of the second object and the noisy set of label data that includes data identifying the noisy location, noisy type, or both for the second object keypoint. A respective user may then submit, e.g., through the user interface and as user inputs, second quality control data indicating whether the noisy set of label data is accurate.

The system determines that the second quality control data is not accurate when the second quality control data indicates that the noisy location, the noisy type, or both is accurate (step 510). That is, because the user who entered the user inputs failed to identify that the noisy location, noisy type, or both for the second object keypoint are in fact deliberately modified to be different from their original values, the system can determine that the second quality control data is overall inaccurate.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a plurality of sets of label data for a sensor reading of an object, each set of label data comprising:
        data identifying a labeled location of a first object keypoint in the sensor reading;
    obtaining respective quality control data corresponding to each of the plurality of sets of label data, the respective quality control data comprising:
        data indicating whether the labeled location of the first object keypoint in the corresponding set of label data is accurate;
    determining an estimated ground truth location for the first object keypoint in the sensor reading from (i) the labeled locations that were indicated as accurate by the corresponding quality control data and (ii) not from the labeled locations that were indicated as not accurate by the corresponding quality control data;
    for each labeled location that is within a threshold distance of the estimated ground truth location, generating data indicating that the labeled location is accurate; and for each labeled location that is not within the threshold distance of the estimated ground truth location, generating data indicating that the labeled location is not accurate.

2. The method of claim 1, further comprising:
generating a training example that associates the estimated ground truth location of the first object keypoint with the sensor reading; and
adding the training example to training data for training a machine learning model.

3. The method of claim 2, further comprising:
training the machine learning model on the training data that includes the training example.

4. The method of claim 1, wherein the sensor reading is a three-dimensional point cloud generated by one or more laser sensors.

5. The method of claim 1, wherein determining the estimated ground truth location for the first object keypoint in the sensor reading comprises computing an average of the labeled locations that were indicated as accurate by the corresponding quality control data.

6. The method of claim 1, wherein generating the data indicating that the labeled location is accurate comprises:
determining whether each labeled location is within the threshold distance of the estimated ground truth location.

7. The method of claim 6, wherein the threshold distance is specific to a type of the first object keypoint.

8. The method of claim 1, further comprising:
for each labeled location that is within the threshold distance of the estimated ground truth location, determining whether the quality control data indicates that the labeled location is accurate and, in response to determining that the quality control data indicates that the labeled location is not accurate, generating data indicating that the quality control data is not accurate; and
for each labeled location that is not within the threshold distance of the estimated ground truth location, determining whether the quality control data indicates that the labeled location is accurate and, in response to determining that the quality control data indicates that the labeled location is accurate, generating data indicating that the quality control data is not accurate.

9. The method of claim 1, wherein:
each of the plurality of sets of label data further comprises labeled values for one or more categorical properties of the first object keypoint;
the respective quality control data corresponding to each of the plurality of sets of label data further comprises, for each of the one or more categorical properties, data indicating whether the labeled value for the categorical property in the corresponding set of label data is accurate; and
the method further comprises, for each of the one or more categorical properties, determining an estimated ground truth value for the categorical property based on (i) the labeled values that were indicated as accurate by the corresponding quality control data and (ii) not from the labeled values that were indicated as not accurate by the corresponding quality control data.

10. The method of claim 9, wherein the one or more categorical properties comprise one or more of: a presence of the first object keypoint or a visibility of the first object keypoint.

11. The method of claim 9, wherein determining an estimated ground truth value for the categorical property comprises determining the estimated ground truth value for the categorical property to be the value that occurs most frequently among labeled values that were indicated as accurate by the corresponding quality control data.

12. The method of claim 9, further comprising, for each of the one or more categorical properties, determining that the labeled values that match the estimated ground truth value for the categorical property are accurate.

13. The method of claim 12, further comprising:
selecting, as an accurate set of label data, any set of label data that has a labeled location that was determined to be accurate and labeled values for each of the categorical properties that were determined to be accurate.

14. The method of claim 1, wherein obtaining respective quality control data corresponding to each of the plurality of sets of label data comprises, for each of the plurality of sets of label data:
providing, for presentation to a respective user on a respective user device, the sensor reading and data identifying the labeled location of the first object keypoint in the set of label data; and
obtaining, from the user device, the data indicating whether the labeled location is accurate.

15. The method of claim 1, further comprising:
obtaining a set of second label data for a second sensor reading of a second object, the set of second label data comprising:
data identifying a labeled location of a second object keypoint in the second sensor reading;
generating a noisy location for the second object keypoint that adds noise to the labeled location;
generating a noisy set of label data for the second sensor reading of the second object, the noisy set of label data comprising: data identifying the noisy location for the second object keypoint;
obtaining second quality control data corresponding to the noisy set of label data, the quality control data comprising:
data indicating whether the noisy location is accurate; and
determining that the second quality control data is not accurate when the second quality control data indicates that the noisy location is accurate.

16. A system comprising:
one or more computers; and
one or more storage devices communicatively coupled to the one or more computers, wherein the one or more storage devices store instructions that, when executed by the one or more computers, cause the one or more computers to perform operations comprising:
obtaining a plurality of sets of label data for a sensor reading of an object, each set of label data comprising:
data identifying a labeled location of a first object keypoint in the sensor reading;
obtaining respective quality control data corresponding to each of the plurality of sets of label data, the respective quality control data comprising:
data indicating whether the labeled location of the first object keypoint in the corresponding set of label data is accurate;
determining an estimated ground truth location for the first object keypoint in the sensor reading from (i) the labeled locations that were indicated as accurate by the corresponding quality control data and (ii) not from the labeled locations that were indicated as not accurate by the corresponding quality control data;

for each labeled location that is within a threshold distance of the estimated ground truth location, generating data indicating that the labeled location is accurate; and for each labeled location that is not within the threshold distance of the estimated ground truth location, generating data indicating that the labeled location is not accurate.

17. The system of claim 16, wherein the operations further comprise:

generating a training example that associates the estimated ground truth location of the first object keypoint with the sensor reading;

adding the training example to training data for training a machine learning model; and training the machine learning model on the training data that includes the training example.

18. The system of claim 16, wherein:

each of the plurality of sets of label data further comprises labeled values for one or more categorical properties of the first object keypoint;

the respective quality control data corresponding to each of the plurality of sets of label data further comprises, for each of the one or more categorical properties, data indicating whether the labeled value for the categorical property in the corresponding set of label data is accurate; and the operations further comprise, for each of the one or more categorical properties, determining an estimated ground truth value for the categorical property based on (i) the labeled values that were indicated as accurate by the corresponding quality control data and (ii) not from the labeled values that were indicated as not accurate by the corresponding quality control data.

19. The system of claim 16, wherein the operations further comprise:

for each labeled location that is within the threshold distance of the estimated ground truth location, determining whether the quality control data indicates that the labeled location is accurate and, in response to determining that the quality control data indicates that the labeled location is not accurate, generating data indicating that the quality control data is not accurate; and for each labeled location that is not within the threshold distance of the estimated ground truth location, determining whether the quality control data indicates that the labeled location is accurate and, in response to determining that the quality control data indicates that the labeled location is accurate, generating data indicating that the quality control data is not accurate.

20. One or more non-transitory computer storage media storing instructions that when executed by one or more computers cause the one or more computers to perform operations comprising:

obtaining a plurality of sets of label data for a sensor reading of an object, each set of label data comprising:
data identifying a labeled location of a first object keypoint in the sensor reading;

obtaining respective quality control data corresponding to each of the plurality of sets of label data, the respective quality control data comprising:
data indicating whether the labeled location of the first object keypoint in the corresponding set of label data is accurate;

determining an estimated ground truth location for the first object keypoint in the sensor reading from (i) the labeled locations that were indicated as accurate by the corresponding quality control data and (ii) not from the labeled locations that were indicated as not accurate by the corresponding quality control data;

for each labeled location that is within a threshold distance of the estimated ground truth location, generating data indicating that the labeled location is accurate; and for each labeled location that is not within the threshold distance of the estimated ground truth location, generating data indicating that the labeled location is not accurate.

* * * * *